Figure 1:
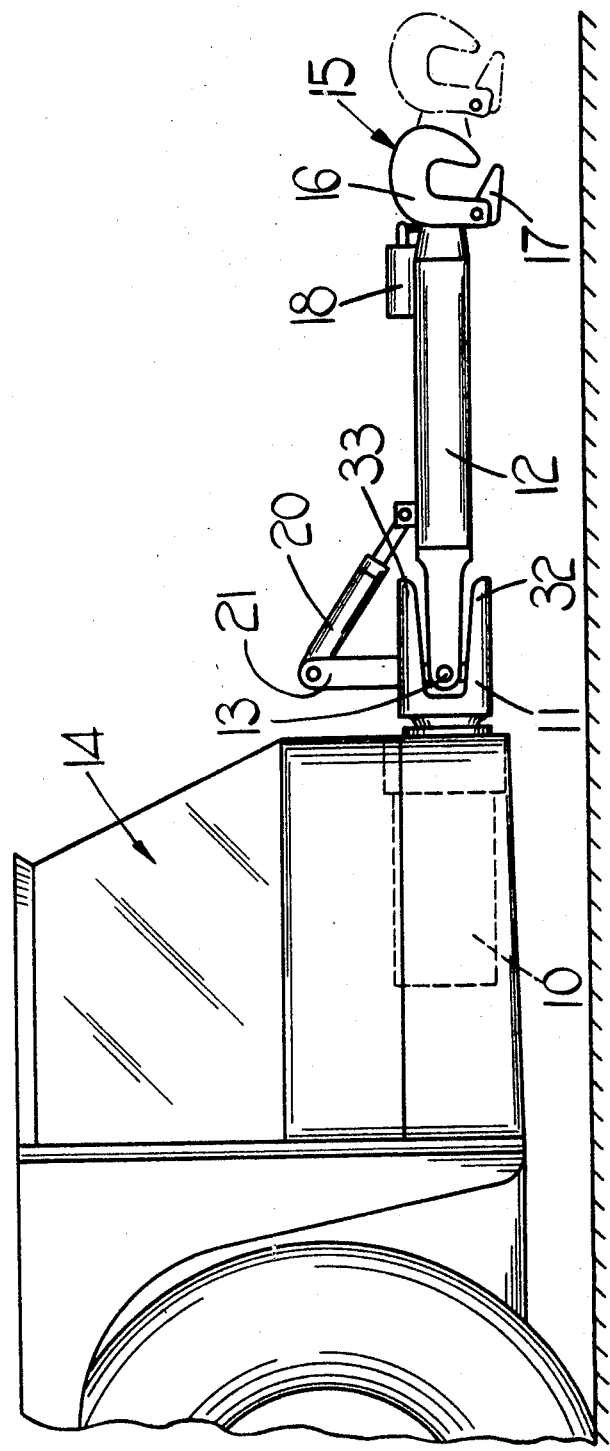

United States Patent
Garnett

[15] 3,649,048
[45] Mar. 14, 1972

[54] TOW-BAR ASSEMBLY
[72] Inventor: Philip Garnett, Mirfield, England
[73] Assignee: Hunslet (Holdings) Limited, Leeds, England
[22] Filed: Feb. 10, 1970
[21] Appl. No.: 10,131

[30] Foreign Application Priority Data
Feb. 18, 1969 Great Britain..........................8,610/69

[52] U.S. Cl.......................280/477, 280/415 A, 280/479 R, 280/486, 280/491 B
[51] Int. Cl..........................................................B60d 1/04
[58] Field of Search..................280/482, 479, 468, 486, 415, 280/491

[56] References Cited
UNITED STATES PATENTS

| | | | |
|---|---|---|---|
| 3,521,908 | 7/1970 | Carter | 280/479 |
| 3,391,948 | 7/1968 | McCown | 280/468 X |
| 2,771,306 | 11/1956 | Ash | 280/468 X |
| 2,375,970 | 5/1945 | Williams | 280/479 |
| 3,404,901 | 10/1968 | Rau | 280/482 X |
| 3,244,434 | 4/1966 | Reed et al. | 280/482 X |
| 1,654,939 | 1/1928 | Loebs | 280/482 |
| 1,991,684 | 2/1935 | Ketel | 280/486 X |

FOREIGN PATENTS OR APPLICATIONS

| | | | |
|---|---|---|---|
| 79,484 | 12/1919 | Austria | 280/415 A |

*Primary Examiner*—Leo Friaglia
*Attorney*—Holman & Stern

[57] ABSTRACT

A tow-bar assembly comprising a fluid-pressure actuated piston and cylinder unit, a mounting bracket and a tow-bar in which the piston or cylinder of the piston and cylinder unit and one end of the tow-bar are connected to the mounting bracket. The connection between the tow-bar and the mounting bracket is such as to permit the tow-bar to pivot relative to the bracket in horizontal and vertical planes. A further fluid-pressure actuated piston and cylinder unit may also be provided for raising and lowering the other end of the tow-bar as may be required when connecting the assembly between two vehicles.

11 Claims, 7 Drawing Figures

Patented March 14, 1972

3,649,048

3 Sheets-Sheet 2

INVENTOR
Philip Garnett
Holman, Glascock, Downing & Seebold
ATTORNEYS

Patented March 14, 1972

3,649,048

3 Sheets-Sheet 3

INVENTOR
Philip Garnett
Holman, Glascock, Downing & Seebold
ATTORNEYS

TOW-BAR ASSEMBLY

This invention relates to a tow-bar assembly which can be used, inter alia, in the towing of large aircraft and other vehicles, the object of the invention being to provide such a tow-bar assembly in an improved form.

In accordance with the invention there is provided a tow-bar assembly which comprises a fluid-pressure actuated piston and cylinder unit, a mounting bracket and a tow-bar, the piston or cylinder of said unit and one end of said tow-bar being connected to the mounting bracket and the connection between said bracket and the tow-bar being such as to permit the tow-bar to pivot relative to the bracket in horizontal and vertical planes.

Preferably, there is also provided a further fluid-pressure actuated piston and cylinder unit which is connected to said tow-bar intermediate the ends thereof and which is adapted in use to raise or lower the other end of the tow-bar as may be required when connecting the assembly between two vehicles.

The component of the first-mentioned piston and cylinder unit i.e., the cylinder or the piston) not connected to the mounting bracket is adapted to be connected in a towing vehicle or in a vehicle which is intended to be towed. Furthermore, said mounting bracket may be arranged so that a second or auxiliary tow-bar can be connected to the bracket if desired after the first-mentioned tow-bar (or main tow-bar) has been swung out of the way.

Means may also be provided in association with the first-mentioned piston and cylinder unit for reducing the shock loading which might otherwise be imposed when the tow-bar assembly is in use and when the towing vehicle or the load to be towed is accelerated or retarded.

Figures 2, 3:
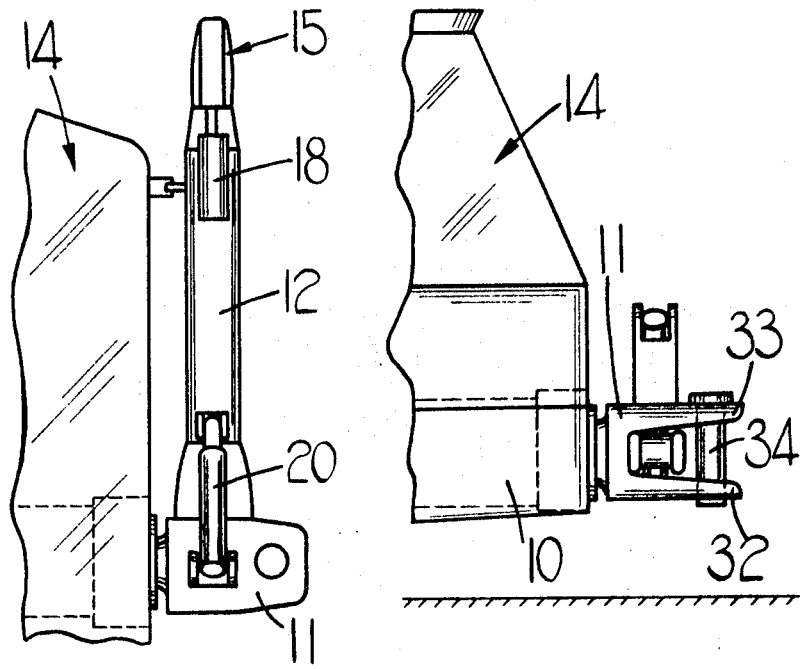
Figure 4:
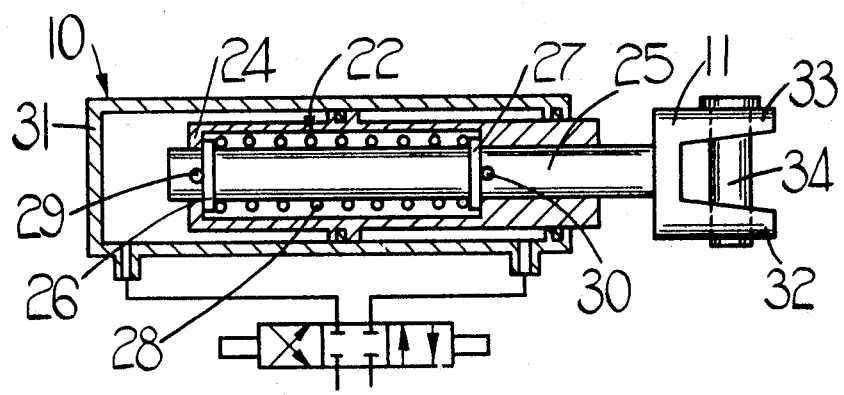
Figure 5:
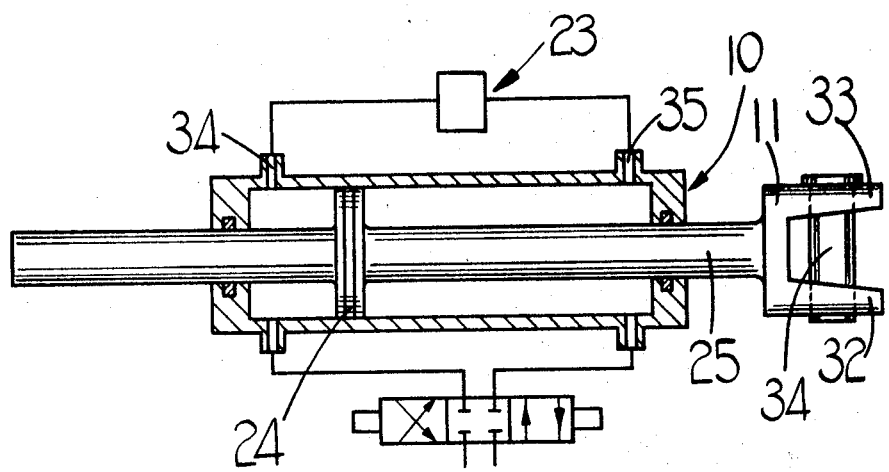
Figures 6, 7:
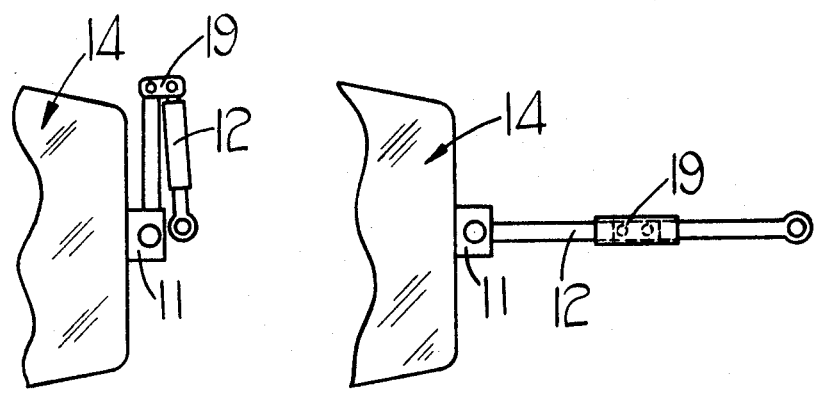

The invention will now be more particularly described with reference to the accompanying drawings wherein FIG. 1 is a side view showing one embodiment of a tow-bar assembly in situ in accordance with the present invention, FIG. 2 is a plan view of the tow-bar assembly shown in FIG. 1 with the main tow-bar in an inoperative position, FIG. 3 is a side view of the tow-bar assembly shown in FIG. 1 illustrating attachment means for an auxiliary tow-bar, FIG. 4 is a side view showing one example of a fluid-pressure actuated piston and cylinder unit which can be used in a tow-bar assembly in accordance with the invention and which incorporates means for the reduction of shock loading, FIG. 5 is a side view showing another example of a fluid-pressure actuated piston and cylinder unit incorporating means for the reduction of shock loading, FIG. 6 is a plan view of a tow-bar assembly having a longer type of tow-bar in a folded position, FIG. 7 is a plan view of the tow-bar assembly shown in FIG. 6 illustrating the longer type of tow-bar in its extended position.

Referring now more particularly to FIG. 1 of the drawings there is shown a tow-bar assembly which is provided with a fluid-pressure actuated piston and cylinder unit 10, a mounting bracket 11 and a tow-bar 12. The piston and cylinder unit 10 is conveniently actuated by hydraulic pressure and one of the two components thereof (i.e., the piston or the cylinder) is connected to the mounting bracket 11. One end of the tow-bar 12 is also connected to the mounting bracket 11 by means of a universal connection 13 which permits the tow-bar 12 to pivot relative to the mounting bracket 11 in horizontal and vertical planes. Furthermore, the piston and cylinder unit 10 and the tow-bar 12 extend in opposite directions from the mounting bracket 11. The other component of the piston and cylinder unit 10 is adapted to be mounted in or connected to either the towing vehicle 14 or the vehicle (such as a large aircraft) which is intended to be towed. The other end of the tow-bar 12, namely that end not connected to said mounting bracket 11 is provided with a hook 15 or any other suitable fitment for connection to the towing vehicle or the towed vehicle (not shown) as the case may be. Where a hook 15 is provided the hook 15 may be arranged so that the throat 16 of the hook 15 is uppermost, a pivotable catch 17 being provided on the hook 15 and a power-actuated device 18 (which may be hydraulically actuated) mounted on the tow-bar 12 adjacent the hook 15 being provided for opening and closing the catch 17 when required. Alternatively, a manually operable or spring-loaded catch (not shown) may be used instead.

The tow-bar 12 itself may be provided intermediate its ends with a joint 19 (as shown in FIG. 7) where a particularly long tow-bar is required so that it can be folded about said joint 19 (as shown in FIG. 6) when not in use. Furthermore, there may be provided a further fluid-pressure actuated piston and cylinder unit 20 which may be connected between an upstanding support 21 secured to the mounting bracket 11 or any other convenient anchoring point and the upper side of the tow-bar 12 whereby said further piston and cylinder unit 20 can be used for the purpose of pivoting the tow-bar 12 in a vertical plane in order to lift or lower the hooked end 15 of the tow-bar 12 as may be required when a connection is to be made. Provision (not shown) is also made for rendering said further piston and cylinder unit 20 ineffective to control movement of the tow-bar 12 in a vertical plane once connection has been made so that there will be no restriction on such movement (or on movement in a horizontal plane) when the tow-bar 12 is in use.

Preferably, there is provided in association with the first-mentioned piston and cylinder unit 10 damping means (indicated in FIG. 4 by the general reference numeral 22 or in FIG. 5 by the general reference numeral 23) for relieving any shock loading that might otherwise occur when the towing vehicle 14 or the load being towed is accelerated or retarded. In the example of such damping means 22 (shown in FIG. 4) the piston 24 of said piston and cylinder unit 10 is of elongated hollow form and the piston rod 25 is arranged to be slidable relative to the piston 24 itself. The piston rod 25 is however formed or provided with a pair of longitudinally spaced outwardly projecting flanges 26, 27 between which is arranged a coil or other form of spring 28. Said flanges 26, 27 are arranged so that they can move axially inwardly towards each other but are limited in their maximum axial separation by means such as shoulders or circlips 29, 30 which engage those axial faces of the flanges 26, 27 which are remote from each other. Thus, if a temporary or shock loading occurs the piston rod 25 will tend to move in an axial direction relative to the piston 24 itself and such movement will have the effect of moving one of said flanges 26 or 27 nearer to the other flange 27 or 26 to compress the spring 28 and thereby absorb the shock loading. The piston 24 itself can of course be moved relative to its containing cylinder 31 by means of hydraulic pressure admitted to one end or the other of the cylinder 31. In the alternative arrangement shown in FIG. 5 of the drawings the piston 24 and piston rod 25 are rigidly connected and the two ends of the cylinder are interconnected by means of a relief valve 23 so that again if a shock loading should occur the relief valve will open to permit transfer of hydraulic fluid from one end of the cylinder to the other.

The mounting bracket 11 conveniently incorporates a pair of jaws 32, 33 and the end of the tow-bar 12 which is connected to the mounting bracket 11 is conveniently connected to the jaws 32, 33 at a position adjacent to the inner ends thereof. Provision may also be made for attaching an auxiliary tow-bar (not shown) when the main tow-bar 12 has been swung in a horizontal plane out of the way. Thus, for example, the outer ends of the two jaws 32, 33 may be adapted to receive a vertically extending pin 34 by means of which one end of the auxiliary tow-bar (not shown) can be pivotally connected to the mounting bracket 11. Such an auxiliary tow-bar may be used in a situation where the towed or towing vehicle (not shown) has a towing connection (not shown) which is not suitable for use with the main tow-bar 12. Thus, for instance, where the main tow-bar 12 has a hooked end 15 it may happen that the required connection on the towed or towing vehicle is not suitable for the particular hook 15 provided on the main tow-bar 12. Also it may happen that a tow-bar of a length different from that of the main tow-bar 12 is required.

In using a tow-bar assembly in accordance with the present invention the two vehicles to be connected would be maneuvered so that that end of the main tow-bar 12 or auxiliary tow-bar (not shown), as the case may be, not connected to the mounting bracket 11 is positioned adjacent to the required coupling point and the final movement or adjustment is then effected by operating the piston and cylinder unit 10 and the piston and cylinder unit 20 so that the connection is finally made by the tow-bar between the two vehicles. It will thus be unnecessary to attempt to make very small and fine adjustments to the relative positions of the two vehicles in order to connect the tow-bar by moving the vehicles themselves, thus avoiding what could otherwise be a difficult and time-consuming operation particularly where large vehicles such as heavy aircraft are involved.

Having thus described my invention what I claim as new and desire to secure by Letters Patent is:

1. A tow-bar assembly comprising a fluid-pressure actuated piston and cylinder unit, a mounting bracket and a tow-bar, the piston or cylinder of said unit and one end of said tow-bar being connected to the mounting bracket and the connection between said bracket and the tow-bar being such as to permit the tow-bar to pivot relative to the bracket in horizontal and vertical planes.

2. A tow-bar assembly as claimed in claim 1 wherein there is provided a further fluid-pressure actuated piston and cylinder unit which is connected to said mounting bracket and to said tow-bar intermediate the ends thereof and which is adapted in use to raise or lower the other end of the tow-bar as may be required when connecting the assembly between two vehicles.

3. A tow-bar assembly as claimed in claim 1 wherein the component of the first-mentioned piston and cylinder unit not connected to said mounting bracket is adapted to be connected in a towing vehicle or in a vehicle to be towed.

4. A tow-bar assembly as claimed in claim 1 wherein said mounting bracket is arranged so that an auxiliary tow-bar can be connected to said mounting bracket.

5. A tow-bar assembly as claimed in claim 4 wherein said auxiliary tow-bar is connected to said mounting bracket when said first-mentioned tow-bar is disposed in an inoperative position.

6. A tow-bar assembly as claimed in claim 1 wherein means are provided in association with the first-mentioned piston and cylinder unit for reducing shock loading.

7. A tow-bar assembly as claimed in claim 6 wherein said means incorporates a fluid pressure release valve connected between the two axial ends of the cylinder of said first-mentioned piston and cylinder unit.

8. A tow-bar assembly as claimed in claim 6 wherein said means includes a piston rod which is resiliently connected to the piston of said unit so as to permit a limited relative movement therebetween in either axial direction.

9. A tow-bar assembly as claimed in claim 1 wherein said tow-bar is formed intermediate its ends with a joint.

10. A tow-bar assembly as claimed in claim 1 wherein the end of said tow-bar remote from said mounting bracket is provided with a hook.

11. A tow-bar assembly as claimed in claim 10 wherein said hook is provided with a pivotable catch.

* * * * *